(12) United States Patent
Brick et al.

(10) Patent No.: US 10,233,590 B2
(45) Date of Patent: *Mar. 19, 2019

(54) FOAMED, OPACIFYING ELEMENTS

(71) Applicant: Eastman Kodak Company, Rochester, NY (US)

(72) Inventors: Mary Christine Brick, Webster, NY (US); Mridula Nair, Penfield, NY (US); Tomas Gerard Patrick McHugh, Webster, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 455 days.

This patent is subject to a terminal disclaimer.

(21) Appl. No.: 15/144,893

(22) Filed: May 3, 2016

(65) Prior Publication Data

US 2016/0355660 A1    Dec. 8, 2016

Related U.S. Application Data

(63) Continuation-in-part of application No. 14/730,280, filed on Jun. 4, 2015.

(51) Int. Cl.
*D06N 3/00* (2006.01)
*C08J 9/236* (2006.01)

(52) U.S. Cl.
CPC ............ *D06N 3/0065* (2013.01); *C08J 9/236* (2013.01); *D06N 3/0063* (2013.01); *D06N 3/0068* (2013.01); *D06N 2209/0853* (2013.01); *D06N 2211/122* (2013.01)

(58) Field of Classification Search
CPC .. D06N 3/0065; D06N 3/0063; D06N 3/0068; D06N 2209/0853; D06N 2211/122; C08J 9/236

See application file for complete search history.

(56) References Cited

U.S. PATENT DOCUMENTS

| | | |
|---|---|---|
| 3,296,023 A | 1/1967 | Leaderman et al. |
| 3,527,654 A | 9/1970 | Jones et al. |
| 3,607,341 A | 9/1971 | Goins et al. |
| 3,615,970 A | 10/1971 | May |
| 3,713,868 A | 1/1973 | Gordon et al. |
| 3,748,217 A | 7/1973 | May et al. |
| 3,862,291 A | 1/1975 | Brandon, Jr. et al. |
| 4,056,646 A | 11/1977 | Westfall et al. |
| 4,137,380 A | 1/1979 | Gunning et al. |
| 4,362,774 A | 12/1982 | Brandon, Jr. et al. |
| 4,397,346 A | 8/1983 | Chumbley et al. |
| 4,409,275 A | 10/1983 | Samowich |
| 4,439,473 A | 3/1984 | Lippman |
| 4,457,980 A | 7/1984 | Daniels et al. |
| 4,572,846 A | 2/1986 | Foss et al. |
| 4,608,298 A | 8/1986 | Klaff |
| 4,677,016 A | 6/1987 | Ferziger et al. |
| 4,830,897 A | 5/1989 | Lichtenstein |
| 5,019,445 A | 5/1991 | Sternlieb |
| 5,132,163 A | 7/1992 | Leaderman et al. |
| 5,360,668 A | 11/1994 | Sternlieb |
| 5,565,265 A | 10/1996 | Rubin et al. |
| 5,576,054 A | 11/1996 | Brown |
| 5,741,582 A | 4/1998 | Leaderman et al. |
| 6,439,269 B1 | 8/2002 | Weil et al. |
| 7,572,846 B2 | 8/2009 | Engelbrecht et al. |
| 7,754,409 B2 | 7/2010 | Nair et al. |
| 7,887,984 B2 | 2/2011 | Nair et al. |
| 8,252,414 B2 | 8/2012 | Putnam et al. |
| 8,329,783 B2 | 12/2012 | Nair et al. |
| 8,435,340 B2 | 5/2013 | Wheeler et al. |
| 8,614,039 B2 | 12/2013 | Nair et al. |
| 9,469,738 B1 * | 10/2016 | Nair .................... C09D 7/65 |
| 2002/0122949 A1 | 9/2002 | Richards |
| 2015/0234098 A1 | 8/2015 | Lofftus et al. |

FOREIGN PATENT DOCUMENTS

EP    1380616    11/1984

* cited by examiner

*Primary Examiner* — Cephia D Toomer
(74) *Attorney, Agent, or Firm* — J. Lanny Tucker

(57) ABSTRACT

A foamable aqueous composition can be used to form foamed, opacifying elements with one or more dry foamed layers. These compositions generally contain: (a) 0.5 to 20 weight % of porous particles comprising a continuous polymeric phase and discrete pores dispersed within the continuous polymeric phase. The porous particles have a mode particle size of 2 to 50 μm; (b) at least 20 weight % of a binder material; (c) 0.1 to 30 weight % of a combination of various additives including dispersants, plasticizers, inorganic or organic pigments and dyes, flame retardants, biocides, fungicides, optical brighteners, tinting colorants, metal flakes, and inorganic or organic fillers; (d) water; and (e) at least 0.001 weight % of an opacifying colorant different from (c). The foamable aqueous composition is suitably aerated, disposed on a porous substrate, dried, and crushed on the porous substrate to form a foamed, opacifying element.

19 Claims, No Drawings

FOAMED, OPACIFYING ELEMENTS

RELATED APPLICATIONS

This is a continuation-in-part of commonly assigned U.S. Ser. No. 14/730,280, filed Jun. 4, 2015 by Brick, Nair, Lindner, and Pyszczek, now abandoned.

Reference is made also to the following commonly assigned patent applications:

U.S. Pat. No. 9,891,350 by Lofftus, Nair, and Brick, entitled "Light Blocking Articles Having Opacifying Layers";

U.S. Pat. No. 9,469,738 by Nair, Brick, and Pyszczek, entitled "Foamed Aqueous Composition" which is a continuation-in-part of commonly assigned U.S. Ser. No. 14/730,269, filed Jun. 4, 2015 by Brick, Nair, Lindner, and Pyszczek, now abandoned; and U.S. Publication No. 2016/0354804 by Brick, Nair, Lindner, and Bessey, entitled "Method of Making Foamed, Opacifying Elements" that is also a continuation-in-part of commonly assigned U.S. Ser. No. 14/730,280, filed Jun. 4, 2015 by Brick, Nair, Lindner, and Pyszczek, now abandoned;

the disclosures of all of which are incorporated herein by reference.

FIELD OF THE INVENTION

This invention relates to foamed, opacifying elements obtained from foamed aqueous compositions that comprise porous polymeric particles, a binder material, various additives, water, and opacifying colorant and has a foam density of at least 0.1 g/cm$^3$ to 0.5 g/cm$^3$. The foamed, opacifying element can be prepared by aerating the foamable aqueous composition, applying it to a porous substrate, drying it, and densification of the foam coating on the porous substrate.

BACKGROUND OF THE INVENTION

In general when light strikes a surface, some of it may be reflected, some absorbed, some scattered, and the rest transmitted. Reflection can be diffuse, such as light reflecting off a rough surface such as a white wall, in all directions, or specular, as in light reflecting off a mirror at a definite angle. An opaque substance transmits almost no light, and therefore reflects, scatters, or absorbs all of it. Both mirrors and carbon black are opaque. Opacity depends on the frequency of the light being considered. "Blackout" or light blocking materials typically refer to coated layers in articles that are substantially impermeable to light such as visible and UV radiation. Thus, when a blackout material such as a blackout curtain is hung over a window, it generally blocks substantially all external light from entering the room through that window. Blackout materials are suitable as curtains for domestic use, for institutional use in hospitals and nursing homes, as well as for use in commercial establishments such as hotels, movie theaters, and aircraft windows where the option of excluding light can be desirable.

Light blocking articles such as the blackout curtains can be comprised of a fabric (porous substrate) coated with several layers of a foamed latex composition. There is a desire for these curtains, in addition to blocking transmitted light, to have a light color (hue) facing the environment where an activity needs illumination so as to minimize the amount of artificial lighting needed to perform the activity. An example is when the function of the blackout material is to separate two areas of activity where one or both areas can be artificially lit at the same time. More often, the function of a blackout curtain is to prevent sunlight from entering a room through a building window. It can also be desirable for the color (hue) of the back side to match the external décor of the building.

Light colored blackout curtains can be made by coating a fabric with light colored foams containing light scattering pigments such as titanium dioxide or clays. However, very thick foam coatings will be needed to create blackout curtains through which the sun is not visible in a darkened room using only these pigments. One method that is used to reduce the weight of such blackout materials is to sandwich a light-absorbing, foamed carbon black layer between two light scattering layers.

When an electromagnetic radiation blocking coating has, as it often does, a strongly light absorbing material containing dark-colored pigments such as carbon black, between two reflective layers, it has at least two distinct problems. First, such materials require three separate coating operations that reduce manufacturing productivity and increase unit costs. Secondly, carbon black in the light absorbing layer can be exposed to the environment by sewing or by surface damage of the white reflective coatings for example during laundering and the damaged area will show the carbon black opacifying agent, which is highly objectionable. Additionally, the stitching in the materials can generate fugitive carbon from the light absorbing layer that can be spread over a larger area thereby increasing the area of objectionable shading of the light colored surface.

U.S. Pat. No. 7,754,409 (Nair et al.), U.S. Pat. No. 7,887,984 (Nair et al.), U.S. Pat. No. 8,252,414 (Putnam et al.), and U.S. Pat. No. 8,329,783 (Nair et al.) describe porous polymer particles that are made by a multiple emulsion process, wherein the multiple emulsion process provides formation of individual porous particles comprising a continuous polymer phase and multiple discrete internal pores, and such individual porous particles are dispersed in an external aqueous phase. The described Evaporative Limited Coalescence (ELC) process is used to control the particle size and distribution while a hydrocolloid is incorporated to stabilize the inner emulsion of the multiple emulsion that provides the pores in the porous particles.

U.S. Patent Application Publication 2015/0234098 (Lofftus et al.) describes improved articles that are designed with an opacifying layer that is capable of blocking predetermined electromagnetic radiation. The opacifying layer is disposed on a substrate that can be composed of any suitable material and a porous or non-porous underlying layer can be incorporated between the substrate and the opacifying layer. While these articles have numerous advantages and represent an important advance in the art, there is a need for further improvement in providing opacifying articles that are lighter in weight; and that have improved flexibility, good "hand," light coloration of the surfaces facing an observer without losing reflectivity, and light-absorptive properties; and launderability, while dark opacifying agents showing through the stitching is minimized.

SUMMARY OF THE INVENTION

The present invention provides a foamed, opacifying element comprising a porous substrate and a dry foamed composition disposed on the porous substrate, wherein the dry foamed composition comprises:

(a) at least 0.1 weight % and up to and including 40 weight % of porous particles, each porous particle comprising a continuous polymeric phase and a first set of discrete pores dispersed within the continuous polymeric phase, the porous particles having a mode particle size of at least 2 μm and up to and including 50 μm;

(b) at least 10 weight % and up to and including 80 weight % of an at least partially cured binder material;

(c) at least 0.2 weight % and up to and including 50 weight % of one or more additives selected from the group consisting of dispersants, plasticizers, inorganic or organic pigments and dyes, flame retardants, optical brighteners, thickeners, biocides, fungicides, tinting colorants, metal flakes, and inorganic or organic fillers;

(d) less than 5 weight % of water, and (e) at least 0.002 weight % of an opacifying colorant different from all of the one or more additives of (c), which opacifying colorant absorbs predetermined electromagnetic radiation, all amounts being based on the total weight of the dry foamed composition.

The embodiments of the present invention provide a number of advantages. For example, the present invention provides a foamed, opacifying element that exhibits desirable opacification with minimal opacifying colorant, minimizes exposure of the opacifying colorant to the environment, eliminates sewing and surface failures in the foamed, opacifying element, can be readily laundered, and provides flexibility, good "hand," drapeability, and brighter and lighter coloration to an observer. In addition, the foamed, opacifying element can be provided in a simplified method using fewer coating operations and thus the foamed, opacifying element has a simplified structure with less essential layers compared to known materials such as those described in U.S. Publication No. 2015/0234098 noted above. Moreover, the present invention utilizes formulations that are more compatible with known foaming (aerating) and densification ("crushing") procedures.

DETAILED DESCRIPTION OF THE INVENTION

The following discussion is directed to various embodiments of the present invention and while some embodiments can be desirable for specific uses, the disclosed embodiments should not be interpreted or otherwise considered be limit the scope of the present invention, as claimed below. In addition, one skilled in the art will understand that the following disclosure has broader application than is explicitly described for any specific embodiment.

Definitions

As used herein to define various components of the foamed aqueous composition and foamable aqueous composition, or materials used to prepare the porous particles, unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term definition should be taken from a standard dictionary.

The use of numerical values in the various ranges specified herein, unless otherwise expressly indicated otherwise, are considered to be approximations as though the minimum and maximum values within the stated ranges were both preceded by the word "about." In this manner, slight variations above and below the stated ranges can be used to achieve substantially the same results as the values within the ranges. In addition, the disclosure of these ranges is intended as a continuous range including every value between the minimum and maximum values.

Unless otherwise indicated, the terms "foamed, opacifying element" and "article" are intended to refer to the same material.

The terms "porous particle" and "porous particles" are used herein, unless otherwise indicated, to refer to porous polymeric materials useful in the foamed aqueous compositions essential for the present invention. The porous particles generally comprise a solid continuous polymeric phase having an external particle surface and discrete pores dispersed within the continuous polymeric phase. The continuous polymeric phase also can be chemically crosslinked or elastomeric in nature, or both chemically crosslinked and elastomeric in nature, to provide better "hand" (feel), flexibility, and drapeability in the product article (foamed, opacifying element) and to provide better durability when it is exposed to high temperatures.

The continuous polymeric phase of the porous particles generally has the same composition throughout that solid phase. That is, the continuous polymeric phase is generally uniform in composition including any additives (for example, colorants) that can be incorporated therein. In addition, if mixtures of polymers are used in the continuous polymeric phase, generally those mixtures also are dispersed uniformly throughout.

The term "porogen" refers to a pore forming agent used to make porous particles for use in the present invention. For example, in the practice of the present invention, a porogen can be the aqueous phase of water-in-oil emulsions (that is in the first emulsion), along with a pore stabilizing hydrocolloid, or any other additive in the aqueous phase that can modulate the porosity of the porous particles.

As used in this disclosure, the term "isolated from each other" refers to the different (distinct) pores of same or different sizes that are separated from each other by some of the continuous solid phase.

The terms "first discrete pore" and "second discrete pore" refer to distinct sets of isolated pores in the porous particles. These first and second discrete pores can refer to distinct individual pores, or in most embodiments, they refer to distinct sets of pores. Each distinct set of pores includes a plurality of pores, each of which pores is isolated from others pores in the set of pores, and the pores of each set of pores are isolated from all other pores of the other sets of pores in the porous particle. Each set of pores can have the same mode average size or both sets can have the same mode average size. The word "discrete" is also used to define different droplets of the first and second aqueous phases when they are suspended in the oil (solvent) phase (described below).

The porous particles can include "micro," "meso," and "macro" discrete pores, which according to the International Union of Pure and Applied Chemistry, are the classifications recommended for discrete pore sizes of less than 2 nm, from 2 nm to 50 nm, and greater than 50 nm, respectively. Thus, while the porous particles can include closed discrete pores of all sizes and shapes (that is, closed discrete pores entirely within the continuous polymeric phase) providing a suitable volume in each discrete pore, macro discrete pores are particularly useful. While there can be open macro pores on the surface of the porous particle, such open pores are not desirable and can be present only by accident. The size of the porous particle, the formulation, and manufacturing conditions are the primary controlling factors for discrete pore size. However, typically the discrete pores independently have an average size of at least 100 nm and up to and including 7,000 nm, or more likely at least 200 nm and up to and including 2,000 nm. Whatever the size of the discrete pores, they are generally distributed randomly throughout the continuous polymeric phase. If desired, the discrete pores can be grouped predominantly in one part (for example, "core" or "shell") of the porous particles.

In some embodiments, where there are different sets of discrete pores, the discrete pores of a first set are predominantly nearer then external particle surface compared to the discrete pores of a second set. For example, a set of smaller discrete pores can be predominantly close to the external particle surface compared to a set of larger discrete pores. As used herein, the term "predominant" means that a larger number fraction of pores of one size is found in a "shell" area nearer the surface of the porous particle than one would expect based on the total number fraction of the two or more types (sizes) of pores present in the porous particle.

The porous particles used in this invention generally have a porosity of at least 5 volume % and up to and including 70 volume %, or likely at least 20 volume % and up to and including 60 volume %, or more typically at least 20% and up to an including 50%, all based on the total porous particle volume. Porosity can be measured by the mercury intrusion technique.

"Opacity" is a measured parameter of a foamed, opacifying element that characterizes the extent of transmission of electromagnetic radiation such as visible light. A greater opacity indicates a more efficient blocking (hiding) of predetermined electromagnetic radiation (as described below). For evaluating the present invention, the "opacity" of a foamed, opacifying element is qualitatively gauged for example, by holding a flashlight behind the foamed, opacifying element (that is, shining light on the element backside). Thus, the ability of a foamed, opacifying element to filter out the impinging radiation from the flashlight is ranked by the extent to which the light is blocked by the foamed, opacifying element. The higher the ranking, the greater the light blocking ability exhibited by the foamed, opacifying element.

Uses

Foamed, opacifying elements of this invention can be useful as light radiation blocking materials to provide blackout curtains, carpets, banners, and window shades for airplanes, labels, projection screens, textile fabrics, and packaging materials. The foamed, opacifying elements can also exhibit improved sound blocking properties. The term "blackout curtain" is intended to include but not limited to, window curtains, shades for all purposes, draperies, room dividers, and cubicle curtains suitable for various environments and structures. The foamed, opacifying elements of the present invention exhibit blackout properties and can optionally have opaque printable surfaces able to accept ink using in screen printing, inkjet printing, or other printing processes. Thus, one can provide opposing printable surfaces in such materials (elements) with the same opacity as if only one side was printed, with no printed image on one side showing through the other side.

Foamable Aqueous Compositions

The present invention can be obtained using foamable aqueous compositions that can be suitably aerated to provide aqueous foamed compositions. The foamable aqueous compositions used in the present invention have five essential components: (a) porous particles as described below; (b) a binder material, also described below; (c) one or more additives as described below; (d) water; and (e) an opacifying colorant different from any of the compounds of component (c), which opacifying colorant absorbs "predetermined electromagnetic radiation" (generally UV to near-IR, for example, from 350 nm to 800 nm or from 350 nm to 700 nm). Optional components that are useful in some embodiments are also described below.

Porous Particles:

Porous particles used in the present invention containing discrete pores (or compartments) are used in the opacifying layers and they are generally prepared, as described below, using one or more water-in-oil emulsions in combination with an aqueous suspension process, such as in the Evaporative Limited Coalescence (ELC) process. The details for the preparation of the porous particles are provided, for example, in the U.S. Pat. No. 8,703,834 (Nair), U.S. Pat. No. 7,754,409 (Nair et al.), U.S. Pat. No. 7,887,984 (Nair et al.), U.S. Pat. No. 8,329,783 (Nair et al.), and U.S. Pat. No. 8,252,414 (Putnam et al.), the disclosures of all of which are incorporated herein by reference. Thus, the porous particles are generally polymeric and organic in nature (that is, the continuous polymeric phase is organic in nature) and non-porous particles (having less than 5% porosity) are excluded. Inorganic particles can be present on the outer surface as noted below.

Thus, the porous particles are composed of a continuous polymeric phase derived from one or more addition or condensation polymers or by polymerization of ethylenically unsaturated polymerizable monomers or oligomers. These materials are chosen so that the porous particles generally have a glass transition temperature ($T_g$) of at least 25° C., or more typically of at least 25° C. and up to and including 180° C., as determined by Differential Scanning calorimetry. However elastomeric particles with $T_g$ below 25° C. can also be used in the practice of this invention provided that they are chemically crosslinked.

In general, the porous particles used in the present invention have a mode particle size equal to or less than 50 µm, or of at least 2 µm and up to and including 50 µm or typically of at least 3 µm and up to and including 40 µm. Most useful porous particles have a mode particle size of at least 3 µm and up to and including 20 µm. Mode particle size represents the most frequently occurring diameter for spherical particles and the most frequently occurring largest diameter for the non-spherical particles in a particle size distribution histogram.

Pore stabilizing materials such as hydrocolloids can be present within at least part of the volume of the discrete pores distributed throughout the continuous polymeric phase, which pore stabilizing materials are described in patents cited above. In some embodiments, the same pore stabilizing material is incorporated throughout the entire porous particles. In many embodiments, the pore stabilizing hydrocolloids are selected from the group consisting of carboxymethyl cellulose (CMC), a gelatin, a protein or protein derivative, polyvinyl alcohol and its derivatives, a hydrophilic synthetic polymer, and a water-soluble microgel.

The porous particles used in this invention can be spherical or non-spherical depending upon the desired use. In a method used to prepare the porous particles, additives (shape control agents) can be incorporated into the first or second aqueous phases, or in the oil (organic) phase to modify the shape, aspect ratio, or morphology of the porous particles. The shape control agents can be added prior to or after forming the water-in-oil-in-water emulsion. In either case, the interface at the oil and second water phase is modified before organic solvent is removed, resulting in a reduction in sphericity of the porous particles. The porous particles used in the present invention can also comprise surface stabilizing agents, such as colloidal silica, on the outer surface of each porous particle, in an amount of at least 0.1 weight %, based on the total dry weight of the porous particle.

The average size of the discrete pores (or individually isolated and closed voids or compartments) is described above.

The porous particles can be provided as powders, or as aqueous suspensions (including water or water with water-miscible organic solvents such as alcohols). Such aqueous suspensions can also include surfactants or suspending agents to keep the porous particles suspended. The other compositional features are described in the incorporated description of methods for preparing the porous particles.

The details for preparing useful porous particles are provided in U.S. Pat. No. 7,887,984 (noted above), U.S. Pat. No. 8,252,414 (noted above), and U.S. Pat. No. 8,703,834 (noted above), U.S. Pat. No. 7,754,409 (Nair et al.), U.S. Pat. No. 8,110,628 (Nair et al.), U.S. Pat. No. 7,887,984 (Nair et al.), U.S. Pat. No. 8,252,414 (Putnam et al.), and U.S. Pat. No. 8,329,783 (Nair et al.), the disclosures of all of which are incorporated herein by reference.

The polymers used in the oil phase of the first emulsion used to prepare the porous particles can provide the continuous polymeric binder of the porous particles. Such polymers include but are not limited to, homopolymers and copolymers such as polyesters, styrenic polymers (for example polystyrene and polychlorostyrene), mono-olefin polymers (for example, polymers formed from one or more of ethylene, propylene, butylene, and isoprene), vinyl ester polymers (for example, polymer formed from one or more of vinyl acetate, vinyl propionate, vinyl benzoate, and vinyl butyrate), polymers formed from one or more α-methylene aliphatic monocarboxylic acid esters (for example, polymers formed from one or more of methyl acrylate, ethyl acrylate, butyl acrylate, dodecyl acrylate, octyl acrylate, phenyl acrylate, methyl methacrylate, ethyl methacrylate, butyl methacrylate, and dodecyl methacrylate), vinyl ether polymers (such as polymers formed from one or more of vinyl methyl ether, vinyl ethyl ether, and vinyl butyl ether), and vinyl ketone polymers (for example, polymers formed from one or more of vinyl methyl ketone, vinyl hexyl ketone, and vinyl isopropenyl ketone). Particularly useful polymers include polystyrenes (including polymers of styrene derivatives), polyesters, styrene/alkyl acrylate copolymers, styrene/alkyl methacrylate copolymers, styrene/acrylonitrile copolymers, styrene/butadiene copolymers, styrene/maleic anhydride copolymers, polyethylene resins, and polypropylene resins. Other useful polymers include polyurethanes, urethane acrylic copolymers, epoxy resins, silicone resins, and polyamide resins. Still other useful polymers are polyesters of aromatic or aliphatic polycarboxylic acids with one or more aliphatic dials, such as polyesters of isophthalic or terephthalic or fumaric acid with diols such as ethylene glycol, cyclohexane dimethanol, and bisphenol adducts of ethylene or propylene oxides. The acid values (expressed as milligrams of potassium hydroxide per gram of resin) of the polyester resins are generally in the range of from 2 to 100. The polyesters can be saturated or unsaturated. Other useful polyesters include what might be considered as "biodegradable" polymers such as lactide polymers, glycolide polymers, caprolactone polymers, and hydroxyalkanoate polymers. Such "biodegradable" polymers, for example having a molecular weight ($M_w$) of less than 100,000, can be considered biologically or chemically degradable under certain environments. Other useful polymers include polymers derived from cellulose such as cellulose acetate, cellulose acetate butyrate, and cellulose acetate propionate.

The continuous polymeric phase of the porous particles can also be derived from ethylenically unsaturated polymerizable monomers and polyfunctional reactive compounds as described for example in U.S. Pat. No. 8,703,834 (noted above).

The porous particles are generally present in the foamable aqueous composition in an amount of at least 0.05 weight % and up to and including 20 weight %, or typically at least 0.5 weight % and up to and including 10 weight %, based on the total weight of the foamable aqueous composition (including water that is present).

Binder Materials:

The foamable aqueous composition used in the present also comprises one or more binder materials (can also be considered a "matrix" material) to hold the porous particles, additives, and opacifying colorants together.

It is particularly useful that the binder material have the following properties: (a) it is water-soluble or water-dispersible; (b) it is capable of forming a stable foamed aqueous composition with the essential and optional components described herein; (c) it is capable of being disposed onto a suitable substrate as described below; (d) it does not inhibit the aeration (foaming) process (described below); (e) it is capable of being dried and where desired also crosslinked (or cured); (f) it has good light and heat stability; (g) it is film-forming but contributes to the flexibility of the foamed, opacifying element and is thus not too brittle, for example having a $T_g$ of less than 25° C.

The choice of binder material can also be used to increase the laundering properties of the resulting foamed opacifying compositions in the foamed, opacifying elements. In addition the binder material can be used to provide a supple feel to touch and flexibility especially when disposed on a porous fabric substrate that is meant for window coverings such as draperies. Thus, the binder material is useful in the foamed, opacifying element for binding together and adhering the porous particles and other components onto the porous substrate.

The binder material can include one or more organic polymers that are film forming and that can be provided as an emulsion, dispersion, or an aqueous solution. It can also include polymers that are self-crosslinking or self-curing, or it can include one or more polymers to which crosslinking agents are added and are thus curable or capable of being crosslinked (or cured) under appropriate conditions.

Thus, in some embodiments, the binder material is crosslinkable (or curable) in the presence of a suitable crosslinking agent that can be included in the foamable aqueous composition and which crosslinking (or curing) is activated chemically with heat, radiation, or other known means. A curing or crosslinking agent serves to provide improved insolubility of the resulting dry foamed composition, cohesive strength, and adhesion to the porous substrate. The curing or crosslinking agent is a chemical having functional groups capable of reacting with reactive sites on binder material (such as a functionalized latex polymer) under curing conditions to thereby produce a crosslinked structure. Examples of suitable crosslinking agents include but are not limited to, multi-functional aziridines, aldehydes, and epoxides.

Useful binder materials include but are not limited, to poly(vinyl alcohol), poly(vinyl pyrrolidone), ethylene oxide polymers, polyurethanes, urethane-acrylic copolymers, other acrylic polymers, styrene-acrylic copolymers, vinyl polymers, styrene-butadiene copolymers, acrylonitrile copolymers, and polyesters, silicone polymers or a combination of two or more of these organic polymers. Such binder materials are readily available from various commercial sources or can be prepared using known starting materials and synthetic conditions. The binder material can be anionic, cationic or nonionic in total charge. A useful class of film-forming binder materials includes aqueous latex polymer dispersions such as acrylic latexes that can be ionic or nonionic colloidal dispersions of acrylate polymers and copolymers. Useful film-forming aqueous latexes include styrene-butadiene latexes, poly(vinyl chloride) and poly(vinylidene chloride) latexes, poly(vinyl pyridine) latexes, poly(acrylonitrile) latexes, and latexes formed from acrylonitrile, butyl acrylate, and ethyl acrylate. Examples of suitable commercially available binder materials include those sold by DSM under the trade names NEOREZ® A-1150, NEOCRYL® A-6093, by Dow under the trade name RHOPLEX® NW-1845K and by BASF under the tradenames BUTOFAN® N S 144, and BUTOFAN® NS 222, and resins sold by Royal Adhesives such as PARANOL® AC-2032.

The binder material generally has a glass transition temperature that is less than 25° C., and more likely equal to or less than 0° C. Glass transition temperature can be determined using known procedures and such values are already known for many polymers useful in this invention. The binder material desirably has adequate flexibility and tensile strength in order to maintain integrity upon handling, especially for use with porous textile substrates.

The one or more binder materials can be present in the foamable aqueous composition in an amount of at least 20 weight % and up to and including 70 weight %, or typically at least 30 weight % and up to and including 50 weight %, based on the total foamable aqueous composition (that is, the total weight of all components including water).

Additives:

The foamable aqueous compositions can include at least 0.1 weight % and up to and including 30 weight % and typically at least 10 weight % and up to and including 20 weight %, of one or more additives such as dispersants, plasticizers, inorganic or organic pigments and dyes (for example, pigment or dye colorants different from the opacifying colorants described below), flame retardants, biocides, fungicides, preservatives, surfactants, pH buffers, optical brighteners, thickeners, tinting colorants, metal pigments such as metal platelets or metal flakes, and inorganic and organic fillers that are not any of the other materials described as additives nor opacifying colorants described below. These amounts refer to the total of all of these additives in a given foamable aqueous composition (or foamed aqueous composition described below), and are based on the total weight of the foamable aqueous composition (including water). There can be mixtures of each type of additive, or mixtures of two or more types of additives.

Any of these additives or mixtures thereof, can be present within any location of the foamed aqueous composition, including but not limited to: the continuous polymeric phase; a volume of the first set (or other set) of discrete pores; or both the first set (or other set) of discrete pores and the continuous polymeric phase of the porous particles. Alternatively, the additive(s) can be present in the binder material alone, or in the binder material and a suitable location in the porous particles.

Useful metal flakes that can be present in the foamed aqueous composition can be from any available commercial source of metal flakes or metal platelets in powder or in suspension form. Such metal flakes are substantially 2-dimensional particles, having opposed main surfaces or faces separated by a relatively minor thickness dimension. The metal flakes can have a size range of at least 2 µm and up to and including 50 µm in main surface equivalent circular diameter (ECD) wherein the ECD is the diameter of a circle having the same area as the main face. Examples of useable metallic platelets include those available from Ciba Specialty Chemicals (BASF) such as aluminum flakes that are available as METASHEEN 91-0410 in ethyl acetate, and gold or copper flakes available from various commercial sources. Further details of useful metal platelets are provided in Cols. 11-12 of U.S. Pat. No. 8,614,039 (Nair et al.), the disclosure of which is incorporated herein by reference.

Useful biocides that can be present as additives include but are not limited to, silver salts such as silver sulfate, silver nitrate, silver chloride, silver bromide, silver iodide, silver iodate, silver bromate, silver tungstate, and silver phosphate, which silver salts can also be considered as antimicrobial agents, antibacterial agents, or antifungal agents.

It can also be useful to include thickeners to modify the viscosity of the foamable aqueous composition and to stabilize it as long as the viscosity does not inhibit aeration (described below). A skilled worker can optimize the viscosity so as to obtain optimal aeration conditions and desired foam density as described below. Thus, useful thickeners can be utilized to control the rheology of the foamable aqueous composition depending upon the method used to at least partially embed it into a porous substrate as described below. Particularly useful rheology modifiers are RHEOVIS® PU 1214 (BASF) and ACRYSOL® G111 (Dow Chemical Company).

Particularly useful additives to be included in the foamable aqueous compositions include one or more tinting colorants that can be used to provide a specific observable color, coloration, or hue in the articles. These materials are not chosen to provide the opacifying property described below for the opacifying colorants and thus, tinting colorants are intended to be different materials than the opacifying colorants.

Mixtures of tinting colorants can be present in the foamable aqueous compositions and they can be different in composition and amount from each other. The desired coloration or hue can be a specific color or the tinting colorants can be used in combination with an opacifying colorant(s) to offset or modify the original color of the resulting foamed, opacifying element to provide more whiteness (or brightness) in the final "color" (or coloration). The one or more tinting colorants can be incorporated within the porous particles (either within the volume of discrete pores, within the continuous polymeric phase, or in both places) or they can be incorporated into the binder material (for example, generally uniformly dispersed throughout). In some embodiments, one or more tinting colorants can be incorporated as an additive within the porous particles that also include an opacifying colorant (as described below) or an optical brightener (as described below). Alternatively, one or more tinting colorants can be present within both the porous particles (in a suitable location) and within the binder material.

In some embodiments, a first population of porous particles described herein can comprise only opacifying colorants as described below, and another population of porous particles containing only tinting colorants can be mixed with the first population of porous particles. The two sets of porous particles can comprise the same or different polymers in the continuous polymeric phase.

The one or more tinting colorants can be present in the foamable aqueous composition in an amount of at least 0.0001 weight %, or more typically at least 0.001 weight %, and up to and including 3 weight %, based on the total weight of the foamable aqueous composition (including water). Tinting colorants can be dyes or organic pigments that are soluble or dispersible in organic solvents and polymers that are used for making the porous particles and can be included within the oil phase. Alternatively, they can primarily water-soluble or water-dispersible materials and included into an aqueous phase.

It can also be useful to include one or more optical brighteners in the foamable aqueous compositions to increase the whiteness (or brightness) of the final coloration. Optical brighteners are sometimes known in the art as "fluorescent whiteners" or "fluorescent brighteners." In general, such materials are organic compounds selected from classes of known compounds such as derivatives of stilbene and 4,4'-diaminostilbene (such as bistriazinyl derivative); derivatives of benzene and biphenyl (such as styril derivatives); pyrazolines; derivatives of bis(benzoxazole-2-yl); coumarins; carbostyrils; naphthalimides; s-triazines; and pyridotriazoles. Specific examples of optical brighteners can be found in various publications including "Fluorescent Whitening Agents," Kirk-Othmer *Encyclopedia of Chemical Technology*, Fourth Edition, volume 11, Wiley & Sons, 1994. One of more of such compounds can be present in an amount of at least 0.001 weight % and typically at least 0.01 weight % and up to and including 2 weight %, all based on the total weight of the foamable aqueous composition.

One or more the optical brighteners can be present in one or more locations in the foamed aqueous composition. For example, an optical brightener can be present in the binder material. Alternatively, an optical brightener can be present within: the continuous polymeric phase; a volume of the first set (or any other set) of discrete pores; or both the first set (or any other set) of discrete pores and the continuous polymeric phase.

Attractive finishes can be imparted to the final foamed, opacifying element by for example, flocking the foamed aqueous composition that is disposed on the porous substrate. Flock or very short (0.2 mm and up to several mm) fibers can be disposed using either by electrostatic or mechanical techniques on the surface of the foamed aqueous composition on the porous substrate.

Water:

Water is the primary solvent used in the foamable aqueous compositions used in the present invention. By "primary" is meant that of the total weight of solvents, water comprises at least 75 weight %, and more likely at least 80 weight % and up to and including 100% of the total solvent weight. Auxiliary solvents that can be present must not adversely affect or harm the other components in the composition, namely the porous particles, binder materials, additives, and opacifying agents. Such auxiliary solvents can be water-miscible organic solvents such as alcohols and ketones.

The solvents then, primarily water, comprise at least 30 weight % and up to and including 70 weight %, or typically at least 40 weight % and up to and including 60 weight %, of the total weight of the foamable aqueous composition.

Opacifying Colorants:

The opacifying colorants used in the present invention can be a single colorant or chosen from any suitable combination of colorants such that the single or multiple colorants form the "opacifying colorant" that absorbs predetermined electromagnetic radiation (defined above) to provide blackout properties. Opacifying colorants can be soluble dyes or pigments or combinations of each or both types of materials.

In most embodiments, the one or more opacifying colorants are present within a volume of the first set (or another set) of discrete pores within the porous particles or within the continuous polymeric binder of the porous particles, or within both the volume of the first set (or another set) of discrete pores and the continuous polymeric binder of the porous particles. This is highly advantageous as the porous particles can be used to "encapsulate" various opacifying colorants as well as tinting colorants and other additives so they are kept isolated from the other components of the foamable aqueous composition and are additionally not exposed to the environment by sewing or surface damage of the foamed, opacifying element. However, in some embodiments, it can be useful to incorporate opacifying agents solely or additionally within the binder material in which the porous particles are dispersed.

As used herein, an "opacifying colorant" includes one or more colorant materials that are chosen, individually or in combination, to provide the blocking of predetermined electromagnetic radiation (as described above). While the opacifying colorants can provide some coloration or desired hue, they are not purposely chosen for this purpose and are thus materials that are chosen to be different from the tinting colorants described above.

Examples of opacifying colorant that can be used individually or in combination include but are not limited to, neutral or black pigments or dyes, carbon black, black iron oxide, graphite, aniline black, anthraquinone black, and combinations of colored pigments or dyes such as cyan, magenta, yellow, green, orange, blue, red and, violet dyes or pigments, and infrared absorbing pigments or dyes. The present invention is not limited to only the specific opacifying colorants described herein but these are considered as representative and as suitable guidance for a skilled worker to devise other combinations of opacifying colorants for the desired absorption in the a predetermined electromagnetic radiation. A carbon black is particularly useful as an opacifying colorant, of which there are many types available from commercial sources. Combinations of dyes or pigments such as a combination of the subtractive primary colored pigments (cyan, magenta, and yellow colored pigments) can also be used to provide a "black" or visually neutral opacifying colorant.

The opacifying colorant can be generally present in the foamable aqueous composition in an amount of at least 0.001 weight % and up to and including 0.5 weight %, or even at least 0.003 weight % and up to and including 0.2 weight %, all based on the total weight of the foamable aqueous composition (that is, the total weight of all components including water). Mixtures of the noted opacifying colorants can be used if desired and these amounts also refer to the total amount of a mixture of opacifying colorants. For example, as noted above, an opacifying colorant can comprise a combination of two or more component colorants (such as a combination of dyes or a combination of pigments) designed in hues and amounts so that the combination meets the desired properties described herein.

In some embodiments, the opacifying colorants, if in pigment form, are generally milled to a fine particle size and then encapsulated within the volume of the discrete pores of the porous particles by incorporating the milled pigment within an aqueous phase used in making the porous particles. Alternatively, the opacifying colorant can be incorporated within the continuous polymeric phase of the porous particles by incorporating the opacifying colorant in the oil phase used in making the porous particles. Such arrangements can be achieved during the manufacture of the porous particles using the teaching provided herein and teaching provided in references cited herein.

In some embodiments, it can be useful to incorporate or dispose at least 95% (by weight) of the total opacifying colorant (or combination of component colorants) within the volume of the porous particles (either in the pores, continuous polymeric phase, or both), and to incorporate the remainder, if any, within the binder material. However, in many embodiments, 100% of the opacifying colorant is within the porous particles. For example, more than 50% of the total opacifying colorant can be disposed or incorporated within the continuous polymeric phase of the porous particles, and the remainder can be incorporated within the volume of the discrete pores.

The opacifying colorants useful in the practice of this invention can be incorporated into the volume of the discrete pores of individual porous particles for example, by incorporating them in a first water phase to form a water-in-oil emulsion or in the continuous polymeric phase of the individual porous particles by incorporating them in the oil phase. In a particular embodiment, an opacifying colorant can be incorporated into the first aqueous phase in the form of a milled solid particle dispersions of the opacifying colorant. Preparation of milled solid particle dispersions can include combining the opacifying colorant particles to be reduced in size with a dispersant and a liquid medium such as water or ethyl acetate (when the opacifying colorant is incorporated in the continuous polymeric phase of the particle) in which the porous particles are to be dispersed, in a suitable grinding mill in which the porous particles are reduced in size and dispersed. The dispersant, an important ingredient in the milling, can be chosen to allow the opacifying colorant particles to be milled in the liquid medium down to a size small enough for incorporation into the discrete pores of the porous particles. The dispersants can be selected to obtain efficient opacifying colorant particle size reduction during milling, provide good colloidal stability of the opacifying colorant particles to prevent agglomeration after milling and impart the desired properties of the final foamed aqueous composition containing the opacifying colorants and the porous particles containing them. Alternatively, the opacifying colorant also can be incorporated in the continuous polymeric phase as a master batch of the opacifying colorant and an appropriate resin.

Foamed Aqueous Compositions

Foamed aqueous compositions can be prepared using the procedures described below wherein an inert gas (such as air) is mechanically incorporated into the foamable composition as described below, which procedures are designed to provide a foam density of at least 0.1 g/cm$^3$ and up to and including 0.5 g/cm$^3$, or more likely of at least 0.15 g/cm$^3$ and up to and including 0.4 g/cm$^3$. Foam density can be determined gravimetrically by weighing a known volume of the foamed aqueous composition.

The essential and optional components of the foamed aqueous composition can be present in different amounts than in the foamable aqueous composition as the foaming process does not appreciably add to or diminish the amounts of such components.

For example, the porous particles (as described above) can be present in the foamed aqueous composition in an amount of at least 0.05 weight % and up to and including 20 weight %, or typically of at least 0.5 weight % and up to and including 10 weight %, based on the total weight of the foamed aqueous composition.

One or more binder materials (as described above) can be present in an amount of at least 20 weight % and up to and including 70 weight % or typically of at least 30 weight % and up to and including 50 weight %, based on the total weight of the foamed aqueous composition.

One or more additives (as described above) can be present in an amount of at least 0.1 weight % and up to and including 30 weight % or typically of at least 10 weight % and up to and including 20 weight %, based on the total weight of the foamed aqueous composition.

Water is also present at the predominant solvent (at least 75 weight % of total solvent weight), and all of the solvents are present in an amount of at least 30 weight % and up to and including 70 weight %, or typically at least 40 weight % and up to and including 60 weight %, based on the total weight of the foamed aqueous composition.

The opacifying colorants (as described above) are generally present in any suitable amount to provide the desired appearance, coloration, and opacity in the resulting foamed, opacifying element. In many embodiments, the one or more opacifying colorants can be present in an amount of at least 0.001 weight % or at least 0.001 weight % and up to and including 0.5 weight %, or even in an amount of least 0.003 weight % and up to and including 0.2 weight %, especially when the opacifying colorant is a carbon black, based on the total weight of the foamed aqueous composition.

Thus, in some embodiments, the foamed aqueous composition comprises at least 0.5 weight % and up to and including 10 weight % of the porous particles (as described above) that have a mode particle size of at least 3 μm and up to and including 30 μm, the amount based on the total weight of the foamed aqueous composition.

In addition, the discrete pores in the porous particles can have an average pore size of at least 100 nm and up to and including 7000 nm.

Moreover, the foamed aqueous composition can comprise at least 0.01 weight % of the opacifying colorant within the porous particles. For example, some opacifying colorant can be a carbon black and present in an amount of at least 0.003 weight % and up to and including 0.1 weight % based on the total weight of the foamed aqueous composition.

Such opacifying colorant can be within: (i) the continuous polymeric phase of the porous particles; (ii) a volume of the first set (or additional set) of discrete pores; or (iii) both the volume of the first set (or additional set) of discrete pores and the continuous polymeric phase of the porous particles.

In addition, the one or more binder materials in the foamed aqueous composition can each be curable.

In some embodiments of the foamed aqueous composition, porous particles can be used that further comprise at least a second set of discrete pores (different from a "first" set of discrete pores), and an opacifying colorant or a tinting colorant can be present within: the continuous polymeric phase, the volume of the second set of discrete pores or in both the continuous polymeric phase and the volume of the second set of discrete pores. First and second sets (or additional sets) of discrete pores can be incorporated into the porous particles using manufacturing technology described in several references cited above, including U.S. Pat. No. 8,110,628 (Nair et al.).

Foamed, Opacifying Elements

Foamed, opacifying elements can be prepared using methods described below. Such articles comprise a porous substrate and a dry foamed composition disposed essentially on the porous substrate.

Such dry foamed compositions are derived from the foamed aqueous composition described above. They comprise at least the following essential components (a) through (e) and amounts, all of which are described in more detail above:

The component (a) porous particles are present in an amount of at least 0.1 weight % and up to and including 40 weight % or at least 0.5 weight % and up to and including 10 weight % of porous particles that are described in detail above, the amounts based on the total weight of the dry foamed composition, particularly when the porous particles have a mode particle size of at least 2 µm and up to and including 50 µm (or at least 3 µm and up to and including 40 µm) and the first set of discrete pores of the porous particles have an average pore size of at least 100 nm and up to and including 7,000 nm.

In addition, the dry foamed composition includes the component (b) binder material in an at least partially cured or crosslinked form, which is at least 10 weight % and up to and including 80 weight %, or at least 20 weight % and up to and including 60 weight % of one or more cured binder materials. Such cured binder materials are derived by at least partial curing or crosslinking (described below) of the binder materials described above. The noted amounts are based on the total weight of the dry foamed composition. Each of the one or more binder materials has a $T_g$ of 25° C. or less.

One or more additives of component (c) are present in an amount of at least 0.2 weight % and up to and including 50 weight %, or at least 3 weight % and up to and including 45 weight %, such additives being are selected from the group consisting of dispersants, thickeners, plasticizers, inorganic or organic pigments and dyes, flame retardants, optical brighteners, biocides, fungicides, tinting colorants, metal platelets, and inorganic or organic fillers, as described above in more detail. The amounts are based on the total weight of the dry foamed composition.

In some embodiments, a carbon black that is present as the opacifying colorant in an amount of at least 0.002 weight % and up to and including 1 weight %, based on the total weight of the dry foamed composition.

Moreover, the foamed, opacifying element can further comprise one or more tinting colorants in the dry foamed composition in an amount of at least 0.0001 weight % and up to and including 3 weight %, based on the total weight of the dry foamed composition. Such tinting colorant(s) can be present in at least the porous particles, and can be elsewhere also.

Overall, the opacifying colorant (carbon black or other material) can be present in the dry foamed composition in an amount of at least 0.02 weight % and up to and including 1 weight %, based on the total weight of the dry foamed composition.

The dry foamed composition is "substantially" dry in nature, meaning that it comprises less than 5 weight %, or even less than 2 weight %, of aqueous medium (including water and any other solvents), based on the total weight of the dry foamed composition. This amount may not include any water that can be present in the discrete pores of the porous particles.

The dry foamed composition can also contain at least 0.002 weight %, or even at least 0.02 weight % and up to and including 1 weight %, of one or more opacifying colorants (e) different from all of the (c) additive compounds (as described above), which opacifying colorants absorb predetermined electromagnetic radiation (as defined above). Details of such opacifying colorants are described above, and the amounts are based on the total weight of the dry foamed composition. Such opacifying colorants can be present within the porous particles. For example, the foamed, opacifying element can comprise a carbon black that is present as the opacifying colorant in an amount of at least 0.002 weight % and up to and including 1 weight %, based on the total weight of the dry foamed composition.

In many embodiments of the foamed, opacifying element, the opacifying colorant (such as carbon black) can be present within: the continuous polymeric phase of the porous particles; a volume of the first set (or additional set) of discrete pores; or both the volume of the first set (or additional set) of discrete pores and the continuous polymeric phase of the porous particles.

Dry porous substrates useful in the practice of the present invention can comprise various woven and nonwoven textile fabrics composed of nylon, polyester, cotton, aramide, rayon, polyolefin, acrylic wool, glass, or felt, or mixtures thereof, or porous polymeric films [such as porous films derived from triacetyl cellulose, polyethylene terephthalate (PET), diacetyl cellulose, acetate butyrate cellulose, acetate propionate cellulose, polyether sulfone, polyacrylic based resin, for example, poly(methyl methacrylate), a polyurethane-based resin, polyester, polycarbonate, aromatic polyamide, polyolefins (for example, polyethylene and polypropylene), polymers derived from vinyl chloride (for example, polyvinyl chloride and a vinyl chloride/vinyl acetate copolymer), polyvinyl alcohol, polysulfone, polyether, polynorbonene, polymethylpentene, polyether ketone, (meth)acrylonitrile], porous paper or other cellulosic materials, canvases, porous wood, porous plaster and other porous materials that would be apparent to one skilled in the art. The porous substrates can vary in thickness as long as they are suitable for the desired application. In most embodiments, the dry porous substrate thickness is at least 50 µm.

Particularly useful porous substrates comprise a porous textile web (such as a flexible porous textile web), porous polymer film, porous cellulosic material, porous ceramic material, or porous glass material.

The porous substrates can be surface treated by various processes including corona discharge, glow discharge, UV or ozone exposure, flame, or solvent washing in order to promote desired physical properties.

In addition, foamed opacifying elements of this invention can be designed with single or multiple dry foamed layers disposed on one or both planar sides of a porous substrate as described above. For example, a single dry foamed layer can be formed on one or both planar sides of the porous substrate using techniques described below.

In other embodiments, a first dry foamed layer (or interlayer) can be disposed or formed on one or both planar sides of a porous substrate, which first dry foamed layer can be formed using a foamable aqueous composition that is designed according to the present invention or it can be designed to be outside the present invention. A second dry foamed (outer) layer can then be disposed on this first dry foamed layer (on either or both planar sides), which second dry foamed layer can be prepared using a foamable aqueous composition according to the present invention.

Thus, in some of such embodiments, the first dry foamed layer can be formed on one or both planar sides of the porous substrate using a foamable aqueous composition according to the present invention, and the foamed opacifying element then has two dry foamed layers that are designed to be within the present invention (however, using the same or different aqueous foamable compositions). In other embodiments, only the second dry foamed layer is formed according to the present invention.

Such alternative arrangements of dual foamed layers can be disposed on a single planar side of the porous substrate, or they can be disposed on both planar sides of the porous substrate.

In all of such instances, one foamable aqueous composition can be used to form the first dry foamed layer and another foamable aqueous composition can be used to form the second dry foamed layer, using the procedures described below.

Method of Making Foamed, Opacifying Elements

The foamed, opacifying elements are prepared by firstly providing a foamable aqueous composition as described above.

This foamable aqueous composition is then aerated to provide a foamed aqueous composition having a foam density of at least 0.1 g/cm$^3$ and up to and including 0.5 g/cm$^3$, or of at least 0.15 g/cm$^3$ and up to and including 0.4 g/cm$^3$. This aeration procedure can be carried out using any suitable conditions and equipment that would be readily apparent to one skilled in the art in order to create a "foam." For example, aeration can be carried out by mechanically introducing air or an inert gas (such as nitrogen or argon) in a controlled manner. High shear mechanical aeration can be carried out using sonication or high speed mixers, such as those equipped with a cowles blade, or with commercially available rotorstator mixers with interdigitated pins such as an Oakes mixer or a Hobart mixer, by introducing air under pressure or by drawing atmospheric air into the foamable aqueous composition by the whipping action of the mixer. Suitable foaming equipment can be used in a manner to provide the desired foam density with modest experimentation. It can be useful to chill or cool the foamable aqueous composition below ambient temperature to increase its stability by increasing its viscosity, and to prevent collapse of the foamable aqueous composition. This chilling operation can be carried out immediately before, after, or during the aeration procedure.

Once the foamed aqueous composition has been formed, it can be disposed onto one or more planar surfaces of a suitable porous substrate (described above). This procedure can be carried out in any suitable manner that does not undesirably diminish the foam density of the foamed aqueous composition. For example, a planar surface of the porous substrate can be coated with the aqueous foamed composition using any suitable coating equipment (floating knife, hopper, blade, or gap). Thus, the foamed aqueous composition of the present invention can be disposed directly onto a planar surface of the porous substrate ("directly" means no intervening or intermediate layers), or it can be disposed indirectly onto the porous substrate, meaning that a dry foamed interlayer can be present (as noted above), and such dry foamed interlayer then becomes a part of the porous substrate.

Once the foamed aqueous composition has been disposed on a planar surface of the porous substrate, it is generally dried to become "substantially" dry (to be defined in relation to the amount of water that is present, as described above for the dry foamed composition), and at least partially cured [meaning the binder material(s) are at least partially cured], simultaneously or in any order, to provide a dry foamed composition on the porous substrate. Drying and at least partial curing can be accomplished by any suitable means such as by heating with warm or hot air, microwaves, or IR irradiation at a temperature and time sufficient for at least drying and at least partial curing (for example, at less than 180° C.). Curing the binder materials can be promoted by heat or radiation or other conditions to which the binder materials are responsive for crosslinking. In one embodiment, a suitable functionalized latex composition is used as the binder material. Upon heating, the binder material dries, and possibly curing or crosslinking reaction taking place between reactive side groups of suitable curable polymer chains. If the particular binder material is not itself heat reactive, suitable catalysts or curing (crosslinking) agents can be added to the foamable aqueous composition to promote curing or crosslinking.

The dry foamed composition on the porous substrate is then crushed or densified on the porous substrate to form a foamed, opacifying element. This densifying process can be carried out in any suitable manner but it is generally carried out by a process that provides pressure to the dry foamed composition, for example, by passing the porous substrate with the dry foamed composition through one or more compression calendering, pressing, or embossing operations. For example, the coated porous substrate can be passed through a combination of calendering and embossing rollers to reduce the thickness of the dry foamed composition and to densify the foam on the porous substrate. The thickness of the dry foamed composition can be reduced by at least 20% during this operation. The process of crushing the dry foamed composition can also be considered a "densifying operation" as the dry foamed composition is made denser while it is pressed together on the porous substrate. The thickness of the dry foamed composition before and after crushing (densifying) can be determined by a known technique such as laser profilometry.

It is also possible to provide an embossed design on the dry foamed composition (or layer) of the foamed, opacifying element during the densifying operation such as for example, by patterned embossing or calendering the dry aqueous foamed composition (or layer), to create selected regions of high and low opacity and thickness. The resulting embossed design can be viewed from either side in transmission.

It further possible to print images on the outer surface of the dry foamed layer of the foamed, opacifying element or on the backside of the porous substrate, or on both, using any suitable printing means such as inkjet printing and flexographic printing, thereby forming printed images of text, pictures, symbols, or other objects, or combinations thereof.

The crushing or densifying process described above can be carried out at any suitable temperature including room temperature (for example, 20° C.) and up to and including 90° C., or more likely at a temperature of at least 20° C. and up to and including 80° C. Some advantages can be accrued from carrying out the crushing or densifying process at about room temperature (that is, from at least 20° C. and up to and including 30° C.), depending upon the glass transition temperature of the porous particles.

The present invention provides at least the following embodiments and combinations thereof, but other combinations of features are considered to be within the present invention as a skilled artisan would appreciate from the teaching of this disclosure:

1. A foamed, opacifying element prepared using any of embodiments 1 to 6, the foamed, opacifying element comprising a porous substrate and a dry foamed composition disposed on the porous substrate, wherein the dry foamed composition comprises:

(a) at least 0.1 weight % and up to and including 40 weight % of porous particles, each porous particle comprising a continuous polymeric phase and a first set of discrete pores dispersed within the continuous polymeric phase, the porous particles having a mode particle size of at least 2 μm and up to and including 50 μm;

(b) at least 10 weight % and up to and including 80 weight % of an at least partially cured binder material;

(c) at least 0.2 weight % and up to and including 50 weight % of one or more additives selected from the group consisting of dispersants, plasticizers, inorganic or organic pigments and dyes, flame retardants, optical brighteners, biocides, fungicides, thickeners, tinting colorants, metal platelets, and inorganic or organic fillers;

(d) less than 5 weight % of water, and (e) at least 0.002 weight % of an opacifying colorant different from all of the one or more additives of (c), which opacifying colorant absorbs predetermined electromagnetic radiation, all amounts being based on the total weight of the dry foamed composition.

2. The foamed, opacifying element of embodiment 1, comprising at least 0.5 weight % and up to and including 10 weight % of the porous particles that have a mode particle size of at least 3 μm and up to and including 40 μm, the amount based on the total weight of the dry foamed composition.

3. The foamed, opacifying element of embodiment 1 or 2, wherein the first set of discrete pores of the porous particles have an average pore size of at least 100 nm and up to and including 7,000 nm.

4. The foamed, opacifying element of any of embodiments 1 to 3, wherein the first set of discrete pores of the porous particles have an average pore size of at least 200 nm and up to and including 2,000 nm.

5. The foamed, opacifying element of any of embodiments 1 to 4, wherein the opacifying colorant is present within the porous particles.

6. The foamed, opacifying element of any of embodiments 1 to 5, further comprising a carbon black that is present as the opacifying colorant in an amount of at least 0.002 weight % and up to and including 1 weight %, based on the total weight of the dry foamed composition.

7. The foamed, opacifying element of any of embodiments 1 to 6, wherein the continuous polymeric phase of the porous particles is chemically crosslinked.

8. The foamed, opacifying element of any of embodiments 1 to 7, wherein the opacifying colorant is present within: the continuous polymeric phase of the porous particles; a volume of the first set of discrete pores; or both the first set of discrete pores and the continuous polymeric phase of the porous particles.

9. The foamed, opacifying element of any of embodiments 1 to 8, wherein the porous substrate comprises a porous textile web, porous polymer film, porous cellulosic material, porous ceramic material, or porous glass material.

10. The foamed, opacifying element of any of embodiments 1 to 9, wherein the porous substrate is a flexible porous textile web.

11. The foamed, opacifying element of any of embodiments 1 to 10, wherein the porous particles further comprise at least a second set of discrete pores, and an opacifying colorant within: the continuous polymeric phase of the porous particles; a volume of the second set of discrete pores; or both the volume of the second set of discrete pores and the continuous polymeric phase of the porous particles.

12. The foamed, opacifying element of any of embodiments 1 to 11, wherein the porous particles have a mode particle size of at least 3 μm and up to and including 20 μm.

13. The foamed, opacifying element of any of embodiments 1 to 12, further comprising one or more tinting colorants in the dry foamed composition in an amount of at least 0.0001 weight % and up to and including 3 weight %, based on the total weight of the dry foamed composition.

14. The foamed, opacifying element of embodiment 13, wherein the one or more tinting colorants are present in at least the porous particles.

15. The foamed, opacifying element of any of embodiments 1 to 14, wherein the opacifying colorant is present in the dry foamed composition in an amount of at least 0.02 weight % and up to and including 1 weight %, based on the total weight of the dry foamed composition.

16. The foamed, opacifying element of any of embodiments 1 to 15, wherein the opacifying colorant is carbon black.

17. The foamed, opacifying element of any of embodiments 1 to 16, wherein the dry foamed composition further comprises an optical brightener.

18. The foamed, opacifying element of any of embodiments 1 to 16, wherein the foamable aqueous composition further comprises an optical brightener within: the continuous polymeric phase; a volume of the first set of discrete pores; or both the volume of the first set of discrete pores and the continuous polymeric phase of the porous particles.

19. The foamed, opacifying element of embodiment 17 or 18, wherein the opacifying colorant is a combination of subtractive primary colored pigments.

20. The foamed, opacifying element of any of embodiments 18 to 19, wherein the dry foamed composition further comprises one or more tinting colorants.

21. The foamed, opacifying element of any of embodiments 1 to 21, wherein the dry foamed composition further comprises a silver salt biocide, an optical brightener, and a tinting colorant.

22. The foamed, opacifying element of any of embodiments 1 to 21, wherein the porous particles have a porosity of at least 20% and up to and including 50%, based on the total porous particle volume, and the discrete pores in the porous particles have an average size of at least 200 nm and up to and including 2,000 nm.

23. The foamed, opacifying element of any of embodiments 1 to 22, wherein the dry foamed composition disposed on the porous substrate is a first dry foamed layer, and the foamed, opacifying element further comprises a second dry foamed (outer) layer disposed on the first dry foamed layer.

24. The foamed, opacifying element of any of embodiments 1 to 23, further comprising an embossed design on an outer surface of the dry foamed composition, or a printed image on either or both of an outer surface of the dry foamed composition and a backside of the porous substrate.

The following Examples are provided to illustrate the practice of this invention and are not meant to be limiting in any manner. The following materials were used in the Examples:

The continuous polymeric phase polymers used in the following examples included the polyesters, Kao E and Kao N, obtained from Kao Specialties Americas LLC, a part of Kao Corporation (Japan) and Skybon EP-3700 obtained from SK Chemicals.

Crosslinker® CX-100, a 100% active, polyfunctional aziridine liquid crosslinking agent was obtained from DSM Coating Resins, LLC.

NALCO® 1060 containing colloidal silica was obtained from Nalco Chemical Company as a 50 weight % aqueous dispersion.

The poly(methylamino ethanol adipate) (AMAE) co-stabilizer was prepared using known procedures and starting materials.

Carboxy methylcellulose (CMC, 250,000 kDa) was obtained from Acros Organics or from Ashland Aqualon as Aqualon 9M31F. These products were used interchangeably.

SOLSPERSE® 43000, a 50% active alkylphenol ethoxylated (APE)-free polymeric dispersant in water, was obtained from Lubrizol Corp.

SOLSPERSE® 32000 and SOLSPERSE® 39000, polyester-grafted polyethyleneimine dispersants, were both obtained from Lubrizol Corp.

SOLSPERSE® 12000, a monosulfonated copper phthalocyanine derivative, and SOLSPERSE® 22000, a mixture of mono-sulfonated and bis-sulfonated derivatives of PY12, were both obtained from Lubrizol Corp.

ZETASPERSE® 2100 dispersant, a derivative of ethoxylated C6-C12 alcohols and polyoxyalkylene amine, was obtained from Air Products and Chemicals, Inc.

TERGITOL® 15-S-7, a C12-C14 secondary alcohol surfactant having an HLB value of 12.4, was obtained from the Dow Chemical Corp.

The carbon black (K) pigment used as an aqueous dispersion was Regal 330 (Cabot Corp.) and was hydrophobically surface modified. The carbon black used as a non-aqueous dispersion was Black Pearls 280 obtained from Cabot Corp.

The cyan (C) pigment PB 15:3 (Sunfast Blue 15:3) was obtained from Sun Chemical Corp.

The titanium dioxide (T) pigment (Kronos 2310) was obtained from Kronos Inc.

The optical brightener TINOPAL® OB CO was obtained from BASF Corporation.

The porous substrate was a white, woven polyester fabric with a dry thickness of approximately 0.125 mm.

The binder material used in the coating formulations was a self-crosslinking acrylonitrile, n-butyl acrylate, ethyl acrylate terpolymer with a glass transition temperature of −10° C.

Measurements:

The mode particle size of the porous particles used in the Examples was measured using a Sysmex FPIA-3000 automated particle size analyzer from Malvern Instruments. The particle size of the dispersed pigments were determined using light scattering.

The porosity of the porous particles was measured using the known mercury intrusion porosimetry method.

The light blocking ability of each foamed, opacifying element in the Examples in transmitted light was evaluated by observing the extent of light coming through each foamed, opacifying element in a darkened room from a diffuse light source, such as a flashlight, held behind its porous substrate. The higher the rating (lesser light showing through), the better the light-blocking ability of the foamed, opacifying element.

The degree of stiffness of each foamed, opacifying element was measured by the L+W Stiffness test. The L&W Stiffness Test instrument determines the resultant bending force in milliNewtons (mN) needed to bend a sample through 15° bend angle. The dimensions of each element sample was 15 mm×70 mm and the average of 4 measurements on each element sample was used as the bending force. The bending stiffness $S_b$ can be calculated from the bending force F using the following equation wherein both $S_b$ and F are directly correlated to the degree of stiffness of the sample:

$$S_b = \frac{60 \times F \times l^2}{\pi \times \theta \times b}$$

$S_b$ bending stiffness mNm

F bending force N $l$ bending length mm $\theta$ bending angle deg $b$ sample width mm The lower the bending force exhibited by a foamed, opacifying element, the more flexible and more easily draped the article is, and this can be a useful property in many uses.

Preparation of Pigment Dispersions for Porous Particles:

All pigment (opacifying colorants and organic and inorganic tinting colorants) dispersions were prepared by combining dry pigment, a dispersant, and a liquid in a suitable milling vessel. The particle size of each pigment was reduced by milling it using ceramic media until all pigment particles were reduced below a diameter of 1 μm as determined by optical microscopy. The dispersions were further diluted using the same liquid medium for incorporation into porous particles. The dispersions varied in the type of pigment, dispersant, dispersant level relative to pigment, and dispersing medium, as shown below in TABLE I. Dv is the volume weighted mean diameter, in nanometers. In TABLE I, the Dispersion is identified by one or more pigments (K, T, C, M, or Y) and the dispersing medium of water (W) or ethyl acetate (EA).

TABLE I

| | | Dispersions | | | |
|---|---|---|---|---|---|
| Dispersion | Pigment | Dispersant (weight % of Pigment) | Dispersing Medium | Pigment Weight % | Dv (nm) |
| K-W | K | SOLSPERSE® 43000 (25) | Water | 1.0 | 99 |
| T-EA | T | SOLSPERSE® 39000 (20) | Ethyl Acetate | 30.8 | 232 |
| C-W | C | SOLSPERSE® 43000 (30) | Water | 5.0 | 139 |
| K-EA | K | ZETASPERSE® 2100 (5) + Kao N (50) | Ethyl Acetate | 1.5 | 191 |

Preparation of Porous Particles:

The various porous particles used for preparing a foamed, opacifying element for each Invention Example and Comparative Example are described below and TABLE II below summarizes the characteristics of the particles.

P1 Porous Particles with No Opacifying Colorant and 1 Weight % Optical Brightener in Continuous Polymeric Phase:

An aqueous phase was made up by dissolving 4.5 g of CMC in 226 g of distilled water. This aqueous phase was dispersed in 749 g of an oil phase containing 19.8 weight % of Kao E polyester and 0.2 weight % of the optical brightener, TINOPAL® OB CO in ethyl acetate using a Silverson L4R homogenizer followed by a Microfluidizer Model #110T (Microfluidics) at a pressure of 9800 psi (690 kg/cm²). An 880 g aliquot of the resulting water-in-oil emulsion was dispersed using the Silverson L4R homogenizer again for two minutes at 1200 RPM, in 1467 grams of a 207 mmolar pH 4 citrate-phosphate buffer containing 123 grams of Nalco® 1060 colloidal silica, followed by homogenization in a orifice homogenizer at 1000 psi (70.4 kg/cm²) to form a water-in-oil-in-water double emulsion. The ethyl acetate was removed under reduced pressure using a Heidolph Lorabata rotary evaporator at 40° C. after dilution of the water-in-oil-in-water emulsion with an equal weight of water. The resulting suspension of solidified porous particles was filtered and washed with water several times and followed by rinsing with a 0.1 weight % solution of TERGITOL® 15-S-7 surfactant. The isolated porous particles were then air dried. Typically the discrete pores contained within the porous particles prepared according to this procedure had an average diameter of from 150 nm and up to and including 1,500 nm.

P2 Porous Particles Containing 1 Weight % Opacifying Colorant (K) in the Continuous Polymeric Phase:

These porous particles used according to the present invention were prepared in a procedure similar to that used for preparing the P1 porous particles except that dispersion K-EA (TABLE I) was included in the oil phase in order to incorporate 1 weight % of carbon black as an opacifying colorant into the continuous polymeric phase composed of Kao N polyester but no optical brightener was used.

P3 Porous Particles Containing 1 Weight % Opacifying Colorant (K) in the Discrete Pores and 1 Weight % Optical Brightener in Continuous Polymeric Phase:

These porous particles were prepared in a procedure similar to that used for preparing the P1 porous particles except that dispersion K-W (TABLE I) was included in the CMC solution (aqueous phase) in order to incorporate 1 weight % of carbon black as an opacifying colorant into the volume of the discrete pores.

P4 Porous Particles Containing 0.2 Weight % Cyan Tinting Colorant (C) in the Discrete Pores to Provide Tinting Colorant:

These porous particles were prepared in a procedure similar to that used for preparing the P1 porous particles except that dispersion C-W (TABLE I) was added to the CMC solution (aqueous phase) in order to incorporate 0.2 weight % of cyan pigment as a tinting colorant (additive) into the volume of the discrete pores of the resulting porous particles and no optical brightener was used.

P5 Porous Particles Containing 1 Weight % Opacifying Colorant (K) in the Discrete Pores and 10 Weight % $TiO_2$ in the Continuous Polymeric Phase:

These porous particles were prepared in a procedure similar to that used for preparing the P3 porous particles except that additionally, T-EA (TABLE I) was added to the ethyl acetate solution (oil phase) in order to incorporate $TiO_2$ pigment (10 weight % based on weight of porous particles) into the continuous polymeric phase.

P6 Porous Particles Containing 1 Weight % Opacifying Colorant (K) in Discrete Pores, and 1 Weight % Optical Brightener and 1 Weight % Crosslinking Agent in the Continuous Polymeric Phase:

These porous particles were prepared similarly to the P3 porous particles except that the continuous polymeric phase was composed of Skybon ET-3700 polyester and was cross-linked with Crosslinker® CX-100 crosslinking agent.

TABLE II

| Particles | Features | Mode Particle size (μm) | Porosity (Vol %) |
|---|---|---|---|
| P1 | No opacifying colorant; Kao N polyester & 1 weight % optical brightener in continuous polymeric phase | 4.9 | 27 |
| P2 | Kao N polyester & 1 weight % K in continuous polymeric phase from K-EA | 5.3 | 32 |
| P3 | Kao N polyester, 1 weight % K in discrete pores from K-W, & 1 weight % optical brightener in continuous polymeric phase | 4.5 | 27 |
| P4 | Kao N polyester & 0.2 weight % C in discrete pores from C-W | 5.7 | 28 |
| P5 | Kao N polyester, 1 weight % K in discrete pores from K-W, & 10 weight % $TiO_2$ in continuous polymeric phase from T-EA | 6.1 | 39 |
| P6 | Skybon ET-3700, 1 weight % opacifying colorant, & 1 weight % crosslinking agent in continuous polymeric phase, & 1 weight % K In discrete pores from K-W | 4.8 | 40 |

Preparation of Foamed Aqueous Compositions and Foamed, Opacifying Elements:

In general, each foamable aqueous composition was made by incorporating appropriate porous particles in an aqueous binder dispersion containing approximately 30 weight % binder material described above, 15-18 weight % clay (additive), 2 weight % titanium dioxide (additive), 3 weight % benzyl isononyl phthalate (additive), and 1 weight % of an ethoxylated octyl phenol coating surfactant (additive). The remainder of each composition weight was composed of water.

For each foamed aqueous composition, the aqueous binder dispersion described above and any additional water were mixed in an appropriately sized beaker (such as a 600 ml glass beaker). Porous particles, in the various examples, were dispersed into this mixture by stirring at 500 rev/minute with an overhead mixer fitted with a Cowles blade, at 25° C. for approximately 30 minutes. Each resulting mixture was then chilled in an ice bath while the mixing speed was increased to approximately 2000 rev/minute for incorporating air into the composition, and mixed for at least 30 minutes until an acceptable foam was obtained. In some cases, foaming was carried out using a hand mixer such as for example a Sunbeam Mixmaster Model #FPS-BHM1503#1, or under pressure using an Oakes 2M Laboratory Mixer Model 2MBT1A. Each resulting foamed aqueous composition was coated onto a surface of the porous substrate described above with a coating knife, dried in a 120° C. oven until the moisture (water) content was below 2 weight % and crushed onto the porous substrate using a Carver Press or laminator rolls, under pressure.

Specific results for each Comparative and Inventive Example are provided in TABLE III below.

Comparative Example 1

A comparative foamable aqueous composition consisted of 50 g of the aqueous binder dispersion without porous particles being added. The resulting mixture was foamed (aerated) in an ice bath to provide a density of 0.151 g/cm$^3$, coated onto a surface of the porous substrate as described above using a coating knife with a 3.175 mm (0.125 inch) gap, and dried. The resulting foamed aqueous composition was crushed on the porous substrate using laminator rolls under pressure. The resulting element did not acceptably block light when tested with the flashlight as described above.

Comparative Example 2

Another comparative foamable aqueous composition consisted of 47.6 g of the aqueous binder dispersion and 2.94 g of a 51 weight % aqueous dispersion of P1 porous particles. The resulting foamable aqueous composition was foamed (aerated) in an ice bath to provide a density of 0.134 g/cm³, coated onto a surface of the porous substrate described above using a coating knife with a 3.175 mm (0.125 inch) gap, and dried. The final dried foamed aqueous composition contained 6.11 weight % of P1 porous particles on a total weight basis. The dried foamed aqueous composition was then crushed on the porous substrate as described for Comparative Example 1. The resulting element did not acceptably block light when tested with the flashlight test as described above.

Invention Example 1

A foamable aqueous composition consisted of 47.2 g of the aqueous binder dispersion and 2.8 g of a 53.62 weight % aqueous dispersion of P2 porous particles. The resulting foamable aqueous composition was foamed (aerated) in an ice bath to provide a density of 0.113 g/cm³, coated onto a surface of the porous substrate described above using a coating knife with a 3.175 mm (0.125 inch) gap, and dried. The final dry foamed aqueous composition contained 6.1 weight % of P2 porous particles and 0.061 weight % of carbon black on a total weight basis. The dry foamed aqueous composition was then crushed on the porous substrate as described in Comparative Example 1. The resulting foamed, opacifying element had a light grey color and exhibited good light blocking using the flashlight test described above compared to Comparative Example 1 that contained no porous particles and compared to Comparative Example 2 that contained no opacifying colorant in the porous particles.

Invention Example 2

The foamable aqueous composition consisted of 47.5 g of the aqueous binder dispersion described above and 2.5 g of a 60.54 weight % aqueous dispersion of P3 porous particles. The resulting foamable aqueous composition was foamed (aerated) in an ice bath to provide a density of 0.176 g/cm³, coated onto a surface of the porous substrate described above using a coating knife with a 3.175 mm (0.125 inch) gap, and dried. The dry foamed composition contained 6.11 weight % of P3 porous particles and 0.0611 weight % of carbon black on a total weight basis. The dry foamed aqueous composition was then crushed on the porous substrate as described in Comparative Example 1. The resulting foamed, opacifying element exhibited good light blocking using the flashlight test as described above compared to Comparative Examples 1 and 2. The color of the foamed, opacifying element of this inventive example was still light grey as in Invention Example 1 but the presence of the optical brightener gave the element a visually brighter look compared to the foamed, opacifying element of Invention Example 1.

Invention Example 3

The foamable aqueous composition consisted of 46.7 g of the aqueous binder dispersion described above, 2.8 g of a 53.62 weight % aqueous dispersion of P2 porous particles, and 0.5 g of a 50.67 weight % aqueous dispersion of P4 porous particles. The resulting foamable aqueous composition was foamed (aerated) in an ice bath to provide a density of 0.166 g/cm³, coated onto a surface of the porous substrate described above using a coating knife with a 3.175 mm (0.125 inch) gap, and dried. The dry foamed aqueous composition contained 7.12 weight % of P2 and P4 porous particles, 0.061 weight % of carbon black, and 0.0021 weight % of cyan pigment on a total weight basis. The dry foamed aqueous composition was then crushed on the porous substrate as described in Comparative Example 1. The resulting foamed, opacifying element exhibited good light blocking using the flashlight test compared to Comparative Examples 1 and 2. In addition, the resulting foamed, opacifying element had a more bluish tint in the grey color compared to the foamed, opacifying element of Invention Example 1, showing that the presence of tinting colorants can be used to modify the color of such elements.

Invention Example 4

The foamable aqueous composition consisted of 47.4 g of the aqueous binder dispersion described above, 1.0 g of a 53.62 weight % aqueous dispersion of P2 porous particles, and 1.6 g of a 60.54 weight % aqueous dispersion of P3 porous particles. The resulting foamable aqueous composition was foamed (aerated) at in an ice bath to provide a density of 0.160 g/cm³, coated onto a surface of the porous substrate described above using a coating knife with a 3.175 mm (0.125 inch) gap, and dried. The dry foamed aqueous composition contained 6.08 weight % of P2 and P3 porous particles and 0.0608 weight % of carbon black on a total weight basis. The dry foamed aqueous composition was then crushed on the porous substrate as described in Comparative Example 1. The resulting foamed, opacifying element exhibited good light blocking using the flashlight test described above compared to Comparative Examples 1 and 2. It was evident that distributing the opacifying colorant between the discrete pores and the continuous polymeric phase of the porous particles did not compromise the light blocking ability of the resulting foamed, opacifying element.

Invention Example 5

The foamable aqueous composition consisted of 47.1 g of the aqueous binder dispersion described above, 1.4 g of a 53.62 weight % aqueous dispersion of P2 porous particles, and 1.5 g of a 1.08 weight % aqueous dispersion of P5 porous particles. The resulting foamable aqueous composition was foamed (aerated) in an ice bath to provide a density of 0.165 g/cm³, coated onto a surface of the porous substrate described above using a coating knife with a 3.175 mm (0.125 inch) gap, and dried. The dry foamed aqueous composition contained 6.17 weight % of P2 and P5 porous particles and 0.0617 weight % of carbon black on a total weight basis. The dry foamed aqueous composition was then crushed on the porous substrate as described in Comparative Example 1. The resulting foamed, opacifying element exhibited good light blocking using the flashlight test described above compared to Comparative Examples 1 and 2. The foamed, opacifying element was also slightly more light blocking than Invention Example 1 and had a lighter hue.

Invention Example 6 (Two-Layer Element)

A foamable aqueous composition for a first dry foamed layer consisted of 46.9 g of the aqueous binder dispersion described above and 3.1 g of a 48.59 weight % aqueous dispersion of P6 porous particles. The foamable aqueous composition was foamed (aerated) in an ice bath to provide a density of 0.147 g/cm$^3$, coated onto a surface of the porous substrate described above using a coating knife with a 3.175 mm (0.125 inch) gap, and dried. The dry foamed aqueous composition in the first dry foamed layer (or interlayer) contained 6.15 weight % of P6 porous particles and 0.0615 weight % of carbon black on a total weight basis. The first dry foamed aqueous composition was then crushed on the porous substrate as described above in Comparative Example 1.

A foamable aqueous composition for a second dry foamed (outer) layer consisted of 50 g of the aqueous binder dispersion described above. The resulting foamable aqueous composition was foamed (aerated) in an ice bath to provide a density of 0.145 g/cm$^3$, coated over the first dry foamed layer (interlayer) described above using a coating knife with a 1.27 mm (0.050 inch) gap, and dried. The dry foamed aqueous composition of this second dry foamed (outer) layer was crushed on the previously crushed first dry foamed layer using the procedure described above in Comparative Example 1. The resulting dual-layer foamed, opacifying element exhibited good light blocking using the flashlight test described above compared to Comparative Examples 1 and 2. Additionally, the second dry foamed (outer) layer of the foamed, opacifying element was white in color instead of light grey due to the lack of an opacifying colorant in the second dry foamed (outer) layer.

Invention Example 7 (Two-Layer Element)

In this Example, the foamable aqueous compositions were prepared as described above in Invention Example 6 except that the coating order was reversed. The second dry foamed layer foamable aqueous composition of Invention Example 6 was coated first on the porous substrate, dried, and crushed thereon, followed by the first dry foamed layer composition of Invention Example 6. The resulting dual-layer foamed, opacifying element exhibited good light blocking using the flashlight test described above compared to Comparative Examples 1 and 2.

Each of the resulting foamed, opacifying elements provided in the Examples was evaluated as described above for light blocking ability and degree of stiffness. The results are shown below in TABLE III.

TABLE III

| Element | Flashlight Test | Bending Force (milliNewtons) |
| --- | --- | --- |
| Comparative 1 | Poor light blocking | 2 |
| Comparative 2 | Poor light blocking | 1 |
| Invention 1 | Good light blocking | 2 |
| Invention 2 | Good light blocking | 5 |
| Invention 3 | Good light blocking | 4 |
| Invention 4 | Good light blocking | 3 |
| Invention 5 | Good light blocking | 3 |
| Invention 6 (2-layer) | Good light blocking | 5 |
| Invention 7 (2-layer) | Good light blocking | 2 |

The results provided in TABLE III demonstrate that the foamed, opacifying elements prepared according to the present invention (Invention Examples 1-7) exhibited desirable light blocking properties compared to the foamed, opacifying elements outside the present invention (Comparative Examples 1 and 2). The Invention Examples also exhibited desired flexibility as seen from the low bending force values and while multiple dry foamed layers can be used (Invention Examples 6 and 7), most of the useful embodiments of this invention have simplified structures with a single dry foamed layer.

The invention has been described in detail with particular reference to certain preferred embodiments thereof, but it will be understood that variations and modifications can be effected within the spirit and scope of the invention.

The invention claimed is:

1. A foamed, opacifying element comprising a porous substrate and a dry foamed composition disposed on the porous substrate,
    wherein the dry foamed composition comprises:
    (a) at least 0.1 weight % and up to and including 40 weight % of porous particles, each porous particle comprising a continuous polymeric phase and a first set of discrete pores dispersed within the continuous polymeric phase, the porous particles having a mode particle size of at least 2 μm and up to and including 50 μm;
    (b) at least 10 weight % and up to and including 80 weight % of an at least partially cured binder material;
    (c) at least 0.2 weight % and up to and including 50 weight % of one or more additives selected from the group consisting of dispersants, plasticizers, inorganic or organic pigments and dyes, flame retardants, optical brighteners, thickeners, biocides, fungicides, tinting colorants, metal flakes, and inorganic or organic fillers;
    (d) less than 5 weight % of water; and
    (e) at least 0.002 weight % of an opacifying colorant different from all of the one or more additives of (c), which opacifying colorant absorbs predetermined electromagnetic radiation,
    all amounts being based on the total weight of the dry foamed composition.

2. The foamed, opacifying element of claim 1, comprising at least 0.5 weight % and up to and including 10 weight % of the porous particles that have a mode particle size of at least 3 μm and up to and including 40 μm, the amount based on the total weight of the dry foamed composition.

3. The foamed, opacifying element of claim 1, wherein the opacifying colorant is present within the porous particles.

4. The foamed, opacifying element of claim 1, further comprising a carbon black that is present as the opacifying colorant in an amount of at least 0.002 weight % and up to and including 1 weight %, based on the total weight of the dry foamed composition.

5. The foamed, opacifying element of claim 1, wherein the opacifying colorant is present within: the continuous polymeric phase of the porous particles; a volume of the first set of discrete pores; or both the first set of discrete pores and the continuous polymeric phase of the porous particles.

6. The foamed, opacifying element of claim 1, wherein the porous substrate comprises a porous textile web, porous polymer film, porous cellulosic material, porous ceramic material, or porous glass material.

7. The foamed, opacifying element of claim 1, wherein the porous substrate is a flexible porous textile web.

8. The foamed, opacifying element of claim 1, wherein the porous particles have a mode particle size of at least 3 μm and up to and including 20 μm.

9. The foamed, opacifying element of claim 1, further comprising one or more tinting colorants in the dry foamed composition in an amount of at least 0.0001 weight % and up to and including 3 weight %, based on the total weight of the dry foamed composition.

10. The foamed, opacifying element of claim 9, wherein the one or more tinting colorants are present in at least the porous particles.

11. The foamed, opacifying element of claim 1, wherein the opacifying colorant is present in the dry foamed composition in an amount of at least 0.02 weight % and up to and including 1 weight %, based on the total weight of the dry foamed composition.

12. The foamed, opacifying element of claim 1, wherein the dry foamed composition further comprises an optical brightener.

13. The foamed, opacifying element of claim 12, wherein the opacifying colorant is a carbon black.

14. The foamed, opacifying element of claim 13, wherein the dry foamed composition further comprises one or more tinting colorants.

15. The foamed, opacifying element of claim 1, wherein the continuous polymeric phase of the porous particles is chemically crosslinked.

16. The foamed, opacifying element of claim 1, wherein the dry foamed composition further comprises a silver salt biocide, an optical brightener, and a tinting colorant.

17. The foamed, opacifying element of claim 1, wherein the opacifying colorant is a combination of subtractive primary colored pigments.

18. The foamed, opacifying element of claim 1, wherein the dry foamed composition disposed on the porous substrate is a first dry foamed layer, and the foamed, opacifying element further comprises a second dry foamed (outer) layer disposed on the first dry foamed layer.

19. The foamed, opacifying element of claim 1, further comprising an embossed design on an outer surface of the dry foamed composition, or a printed image on either or both of an outer surface of the dry foamed composition and a backside of the porous substrate.

* * * * *